March 24, 1970 N. LANE 3,502,341

PICK-UP ARMS FOR RECORD PLAYERS

Filed Feb. 9, 1968

Inventor
NORMAN LANE
By Kurt Kelman
AGENT

United States Patent Office 3,502,341
Patented Mar. 24, 1970

3,502,341

PICK-UP ARMS FOR RECORD PLAYERS

Norman Lane, Halesowen, England, assignor to BSR Limited, Warley, England, a British company Filed Feb. 9, 1968, Ser. No. 704,326
Int. Cl. G11b *3/12, 3/28*
U.S. Cl. 274—23 8 Claims

ABSTRACT OF THE DISCLOSURE

An "anti-skate" device for record players comprising a coil tension spring connected between the pick-up arm vertical spindle and the base plate of the record player to bias the vertical spindle, and hence the pick-up arm, outwardly away from the centre of a record to reduce or prevent the tendency for inward skating of the pick-up arm resultant from friction between the record and the stylus carried by the pick-up arm. One end of the tension spring may be connected to a rotatable member to enable the tension in the spring to be adjusted by stretching the spring so as to enable adjustment of the "anti-skating" force.

BACKGROUND OF THE INVENTION

Field of the invention

This invention relates to record players in which a pick-up arm carrying a stylus at its outer end is mounted at the other end for pivotal movement about a vertical axis for tracking when playing a record and for pivotal movement about a horizontal axis for raising and lowering of the pick-up arm to bring the stylus out of and into engagement respectively with the record.

In modern pick-up arms there is a natural tendency for the pick-up arm to move inwardly towards the record centre. This is due to the frictional drag acting between the stylus and the record with which it is engaged which causes a turning moment to act on the pick-up arm vertical spindle to cause the stylus to pivot inwardly towards the record centre.

Hitherto, in monaural records, this has been of no great disadvantage apart from the tendency to cause slight wear on one side of the stylus tip, but in the case of stereo records of 45/45 grooves, there is a tendency for this lateral force to cause the stylus to favour one channel and assume an out-of-vertical position.

However, there is now a tendency towards the use of very much lower stylus playing weights (e.g. a playing weight of 2 grammes or less as compared with 6 grammes or so, commonly used hitherto). With such a low playing weight as 2 grammes, frictional resistance to rotation of the pick-up arm vertical spindle has to be reduced to the very minimum. Generally, pick-up arms in modern record players have means to enable the stylus playing weight to be adjusted to any required value between the minimum and maximum, according to user requirements, and with friction in the vertical spindle of the arm kept to the absolute minimum in order to satisfy the very light playing weight requirements, a problem arises when the pick-up arm is adjusted to the heavier playing weight because, at this weight, the lateral thrust (referred to above) is quite appreciable and there can occur what is known as "skating" wherein the stylus over-rides the record groove and moves radially inwards. It will be understood that with a pick-up arm which was designed only for the heavier playing weights in the past, there has been sufficient frictional resistance in the vertical spindle of the arm to prevent this "skating" from taking place but when this frictional resistance is reduced to a minimum (to cater for the light playing weight) then the resistance is not enough to prevent the "skating" problem from arising when the arm is working at the heavier playing weight. At the lighter playing weight the lateral thrust is insignificant and no "skating" problem arises.

Description of the prior art

Certain prior proposals for counteracting the lateral thrust have involved the use of counterweights or flat clock-like type springs acting upon the pick-up arm.

The object of the invention is to provide an improved and simplified means to eliminate or substantially reduce the tendency for skating of the pick-up arm when working at the heavier playing weights for the stylus.

SUMMARY OF THE INVENTION

Accordingly, in a record player of the kind hereinbefore referred to, means to prevent skating of the pick-up arm when working at the heavier playing weights comprising tension spring means connected at one end to a member which rotates with the pick-up arm vertical spindle, such connection being at a position spaced from the axis of said spindle and the spring being connected at the other end to a member mounted upon a fixed base plate of the apparatus at a position spaced away from the pick-up arm vertical spindle axis, such that inwards pivoting movement of the pick-up arm results in stressing of said spring in the direction of its length so as to apply a substantially constant restoring torque to the pick-up arm to counteract any tendency towards skating, means being provided for adjusting the restoring torque.

Such means for adjusting the restoring torque may be as follows, for example one end of the spring may be connected to a peg which is connected to, and off-set radially from, a vertical spindle pivotally mounted in a fixed base plate of the apparatus whereby turning of the spindle about its vertical axis causes this end of the spring to be stretched around a part of the spindle of constant radius.

With such an arrangement, as the total angular movement of the pick-up arm is not very great, and also as the extension of the spring between the two extreme positions is not great, then as the spring tension increases slightly the moment arm decreases slightly and the restoring torque remains substantially constant.

BRIEF DESCRIPTION OF THE DRAWINGS

One embodiment of the invention will now be described in more detail with reference to the accompanying drawings wherein.

DESCRIPTION OF THE PREFERRED EMBODIMENT

Figure 1:
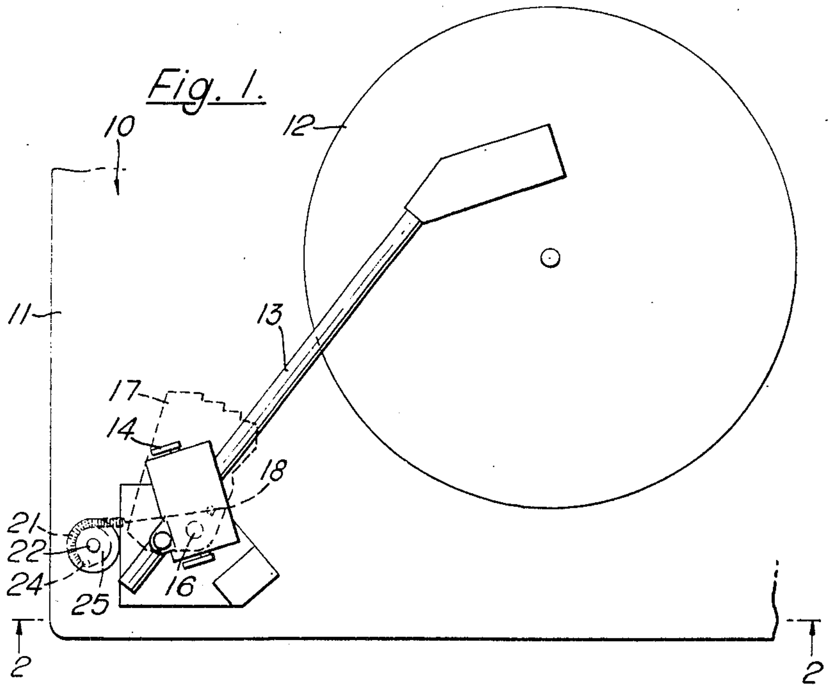
FIGURE 1 is a fragmentary diagrammatic plan view of a record player according to the invention.
Figure 2:
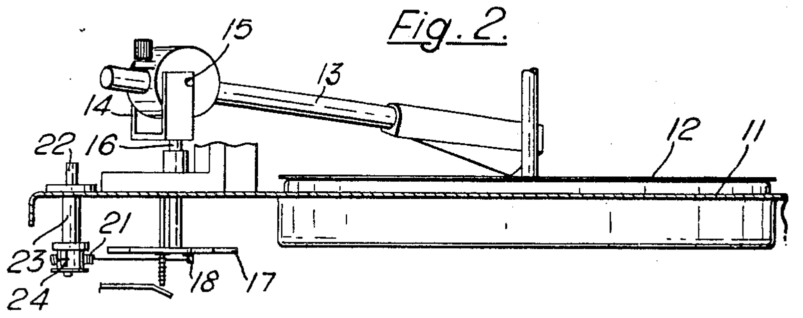
FIGURE 2 is a section on the line 2—2 of FIGURE 1, and, FIGURE 3 is part of FIGURE 2 drawn to an enlarged scale.
Figure 3:
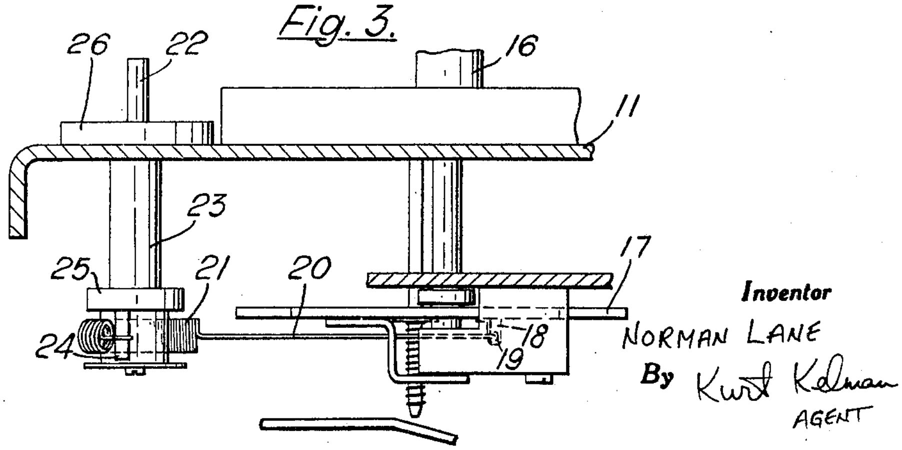

In this embodiment the record player is indicated generally at 10 and includes a deck or base plate 11 having a turntable 12 rotatably mounted thereon. The base plate 11 also carries a pick-up arm 13 mounted in a yoke 14 about a horizontal axis 15 and the yoke 14 is carried at the upper end of a vertical spindle 16 for movement of the pick-up arm 13 about a vertical axis.

The pick-up arm vertical spindle 16 has secured adjacent its lower end, the normal form of quadrant selector plate 17 by means of which the pick-up arm 13 is caused to perform an automatic cycle of operations. Fixed to the underside of said selector plate 17 is a downwardly cranked lug 18 which has its lower end 19 off-set radially fromt he pivotal axis of the pick-up arm and to this end there is connected a wire 20 leading from the one end of the close coiled tension spring 21.

The other end of this spring 21 is connected to an adjustable member 22 mounted in the record player base plate 11. The member 22 comprises a vertical spindle 23 extending downwardly below the base plate 11 and having a radial off-set peg portion 24 extending parallel to its axis with the said spindle 23 about its axis in the appropriate direction causes the spring to be wound round a constant radius part 25 of the spindle for the purpose of increasing or decreasing the initial tension in the spring according to the amount of restoring torque required for any particular playing weight which is in excess of the minimum.

The aforesaid spindle 23 may extend above the base plate 11 of the apparatus and there may be provided a radially extending flange 26 formed integrally with the spindle 23 and located immediately above the base plate 11 and calibration figures (corresponding to the playing weight being used) may be provided on said flange 26 whereby the appropriate restoring torque may be selected by turning the spindle from above the base plate until the desired calibration mark is aligned with an index mark on the base plate 11.

The arrangement is such that, at the minimum playing weight of 2 grammes or so, the spring is virtually unstressed and little or no restoring torque is provided.

The lug 18 and the constant radius part 25 of the member 22 are positioned so that the line of action of the spring 21 is substantially parallel to the line joining the axis of the member 22 to the axis of the vertical spindle 16.

The lug 18 is also positioned so that the moment arm exerted by the spring 21 on the spindle 16 is of the desired value to counteract the "skating" tendency.

What I then claim is:

1. In a record player, including a base plate, a turntable rotatably mounted thereon, a pick-up arm carrying a stylus at one end and pivotally mounted, at a position spaced from said one end, on the upper end of a vertical spindle for movement about a horizontal axis and said spindle being mounted on the base plate for movement about a vertical axis, the improvement comprising tension spring means connected at one end to a member which rotates with the pick-arm vertical spindle, said connection being at a position spaced from the axis of said spindle and the spring being connected at the other end to a member mounted upon a fixed base plate of the apparatus at a position spaced away from the pick-up arm vertical spindle axis, so that inwards pivoting movement of the pick-up arm results in stressing of said spring in the direction of its length so as to apply a substantially constant restoring torque to the pick-up arm to counteract any tendency towards skating, and means for adjusting the restoring torque comprising a peg, connected to and offset radially from, a vertical spindle pivotally mounted in a fixed base plate of the apparatus whereby turning of said vertical spindle about its vertical axis causes the end of the spring connected thereto to be stretched around a part of the spindle of constant radius.

2. The improvement according to claim 1 wherein said spring means is a close coiled tension spring.

3. The improvement according to claim 2, wherein said restoring torque can be adjusted down to zero value.

4. The improvement according to claim 1, wherein said vertical spindle carrying said peg is provided with calibrations to enable setting of the restoring torque to a desired value.

5. The improvement according to claim 1, wherein said member connected to said one end of the spring is a quadrant plate.

6. The improvement according to claim 5, wherein the line of action of said spring is substantially parallel to a line joining the axis of pivot of the pick-up arm vertical spindle and the vertical spindle carrying said peg.

7. The improvement according to claim 6, wherein said restoring torque can be adjusted down to zero value.

8. The improvement according to claim 1 wherein the line of action of said spring is substantially parallel to a line joining the axis of pivot of the pick-up arm vertical spindle and the vertical spindle carrying said peg.

References Cited

UNITED STATES PATENTS 1,866,403 7/1932 Elmer ---------------- 274—23
3,294,403 12/1966 Reed et al. ----------- 274—23

FOREIGN PATENTS 1,389,300 1/1965 France.
1,239,116 4/1967 Germany.

HARRY N. HAROIAN, Primary Examiner